May 5, 1925.

G. LANE ET AL

PHOTOGRAPHIC APPARATUS

Filed July 24, 1922

1,536,718

Inventors:
George Lane, and
John E. Patterson,
by Spear, Middleton, Donaldson & Hall
Attys.

Patented May 5, 1925.

1,536,718

UNITED STATES PATENT OFFICE.

GEORGE LANE AND JOHN E. PATTERSON, OF POUGHKEEPSIE, NEW YORK.

PHOTOGRAPHIC APPARATUS.

Application filed July 24, 1922. Serial No. 577,190.

*To all whom it may concern:*

Be it known that we, GEORGE LANE and JOHN E. PATTERSON, citizens of the United States, and residents of Poughkeepsie, in the county of Dutchess and State of New York, have invented certain new and useful Improvements in Photographic Apparatus, of which the following is a specification.

Our present invention relates to a device for stereoscopic photography, and more particularly to that system of photography which is commonly known as "moving pictures".

The principal object of our invention is the photography of a desired subject upon a single strip of film by presenting alternate images of the same subject to the film.

Another object is the projection of an image of an object from alternate viewpoints upon the film to form what we term "right" and "left" pictures.

To this end our invention consists in providing mirrors before the camera lens connected with the mechanism of the camera, so that the light rays from a given subject will reach the same lens from slightly different angles, thereby producing alternate right and left pictures on the film.

We have devised certain instrumentalities by means of which these results may be accomplished, but in illustrating this combination of parts in the drawings we have merely shown a satisfactory form, and it is to be understood that we are not limited to either this arrangement, combination, or construction of parts, as obviously the desired objects may be accomplished by other than the means shown.

Figure 8:
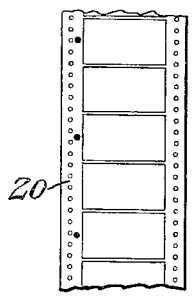
Fig. 8 is a view of a piece of film showing marked pictures.
Figure 1:
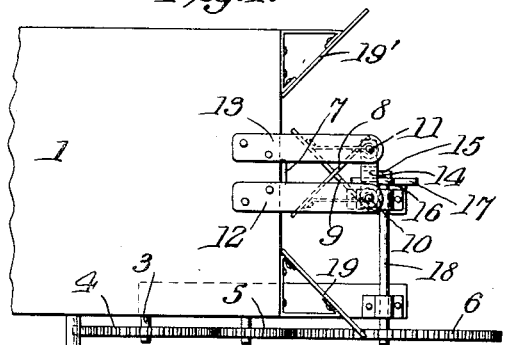
Fig. 1 is a plan view of one form of our device.
Figure 6:
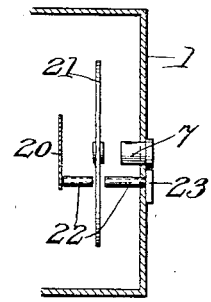
Fig. 6 is a diagrammatic view of one form of marking device.
Figures 2, 5:
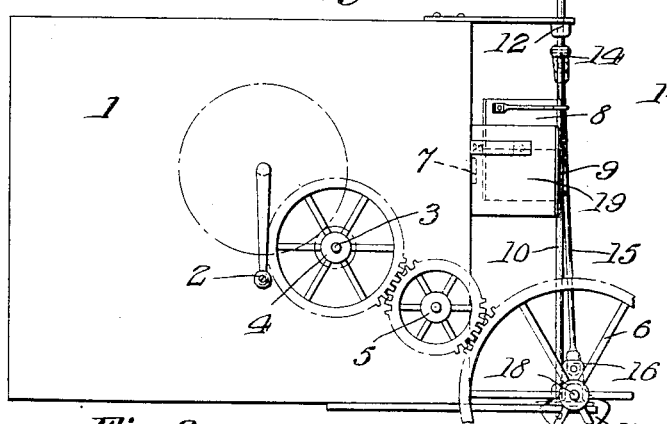
Fig. 2 is a side elevation.
Fig. 5 is a side elevation.
Figure 3:
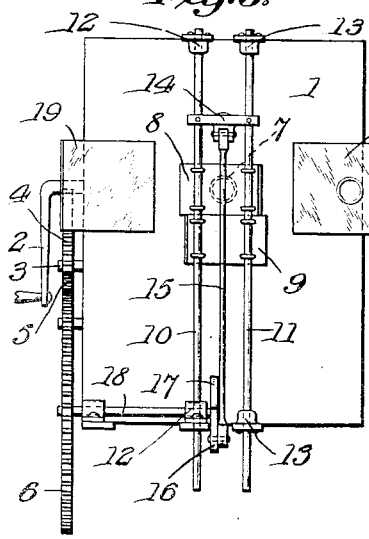
Figs. 3 and 4 are front elevations showing each mirror in position.
Figure 4:
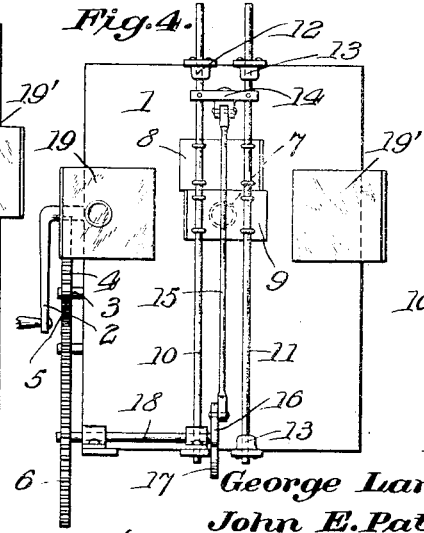
Figure 7:
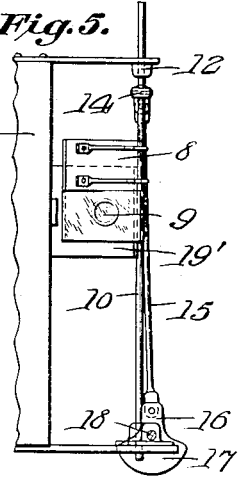
Fig. 7 is a front elevation of a modified form of pitman.

Referring now more particularly to these drawings, we have shown a camera box at 1 having the usual crank 2 for reeling and exposing the film. A trick shaft 3 to which is attached a gear 4 revolves once per exposure. A gear 4 meshes with an intermediate pinion 5 which in turn is connected to the driven gear wheel 6. This last mentioned member is arranged to make one-half revolution during the complete revolution of the member 4. The photographic lens of the camera is illustrated at 7. Vertical mirrors 8 and 9, preferably of the first surface type, are placed one above the other and mounted upon rods 10 and 11 respectively. These rods are vertically reciprocable in bearings 12 and 13. A cross bar 14 connecting the rods 10 and 11 is secured to a pitman 15 which is in turn attached to a crank arm 16 provided with a counterweight 17. The crank arm 16 and associated mechanism is mounted for rotation upon the shaft 18 which carries the gear wheel 6. Thus one-half rotation of the wheel 6 will cause an extreme vertical movement of the mirrors 8 and 9. The mirror 9 is adapted to occupy a position directly in front of, but at substantially 45° to the axis of the lens 7 when the crank arm 16 occupies its uppermost vertical position. Likewise the mirror 8 occupies a position in front of but 45° to the axis of the lens when the crank arm 16 occupies its vertical downward position. Additional mirrors 19 and 19' at substantially 180° from the surface of mirrors 8 and 9 are provided to doubly reflect the image of the subject into the lens 7.

The operation is as follows:

Rotation of the crank 2 causes the ordinary feeding of the film past the lens 7 and also rotation of the gear wheel 6. Movement of this latter member causes a reciprocal motion of the rods 10 and 11 to which mirrors 8 and 9 are connected, thereby alternately presenting these members to the lens of the camera. Thus for a right hand picture, light striking mirror 19 is reflected to mirror 8 and thence into the lens. Further movement of the gear 6 causes the mirror 8 to be raised from in front of the lens, thus presenting mirror 9 thereto, and a left hand picture is then formed, as the light strikes mirror 19 and is reflected therethrough into the mirror 9, and thence into the lens 7. It will be understood that exposure of the film occurs as the crank 16 passes the upper and lower centers. The mirrors 8 and 9 are of sufficient vertical width to respectively fully cover the field during the whole of each exposure, notwithstanding some vertical movement of said mirrors during that time.

The camera shutter is closed during the half stroke positions of crank 16 and at which period the negative film is shifted in the camera for the next exposure. It will be apparent that the movement of the mirrors 8 and 9 being in the plane of their surfaces, the exact location is immaterial during exposure, provided they respectively and alternately cover the field. Movement in their plane during exposure has no effect. If the mirrors 8 and 9 so move during the respective exposures, any imperfections in the mirrors is equally distributed over the picture presented to the film, thereby eliminating local defects.

With the utilization of these instrumentalities the entire mechanism may be attached to the ordinary cinematographic camera. This system of producing alternate pictures upon the film avoids shock and jar to the parts at any point and consequent vibration of the camera. The particular arrangement of parts shown permits close fitting bearing surfaces for the movable mirrors situated at a maximum distance apart. This insures a minimum lost motion, it being very essential that the mirrors be accurate to position; otherwise succeeding pictures will not be in accurate register.

The invention further consists in a novel arrangement of parts by which the right and left pictures on a film may be designated, so that anyone having to make repairs to the film or adjustments may be instantly able to do so, and be assured that the right and left pictures are in proper sequence.

We have illustrated diagrammatically one system of carrying out this procedure, and the film 20 is shown as being progressively fed past the lens 7 in the camera by the ordinary means.

The exposure shutter is shown at 21 as passing between the ends of a light tube 22 communicating with the exterior of the camera box 1. A supplemental shutter 23 is vertically movable through the instrumentality of the movable mirror combination, and is arranged to expose the film through the tube for one picture, and not for the alternate. These exposure spots being developed on the negative and allowed to print on the positive, will give an automatic indication of which one of the stereo pair any certain picture anywhere in the strip may be. It will thus be apparent that it is only necessary to see that the marked pictures are separated by one not marked, in order to produce the regular alternation of right and left pictures.

It may be found desirable to arrange for one set of reflectors only, the other picture being taken into the lens direct. Such an arrangement would simplify the construction, but possibly vary the intensity of the negatives, due to loss in reflection. In the above modification it may be necessary to have merely the mirror 9 mounted upon the pitman, as before, the pitman being provided above the mirror with a loop 24 attached at its upper end to the bar connecting the vertical rods. Through this loop the image of the object will be taken direct into the lens.

We claim:

1. A photographic apparatus including a casing, a lens, a mirror movable across the lens axis to reflect an image into said lens, a light sensitive surface behind said lens, a shutter between the image and the sensitive surface, and means to move said mirror during exposure of said surface, said surface receiving a reflected image from said mirror alone, during the reflective period of the mirror.

2. The device of claim 1, said shutter means protecting said sensitive surface from light when an edge of said mirror passes said lens.

3. The device of claim 1, the movement of said mirror being slowed progressively as said mirror reaches the extremities of its movement.

4. A method of photographing a subject to form a photographic pair of pictures, which includes the step of allowing two images of the subject to pass into a common lens, said images being from different angles, one of said images being taken direct into the lens.

5. A photographic apparatus including a casing, a lens, a mirror movable across the lens axis to reflect an image into the lens, a light sensitive surface behind the lens, a shutter between the image and the sensitive surface, said surface receiving a reflected image from said mirror alone, during the reflective period of the mirror, and means to move said mirror in two directions during the reflective period of the mirror.

6. In a camera for taking moving pictures, a casing, a lens, a shaft adapted to revolve at the uniform rate of one-half revolution to each film frame advance, a reciprocable mirror to reflect an image into the lens, and a connecting rod between said shaft and mirror, a crank on said shaft, and a shutter synchronized to expose a light sensitive surface within the casing to said image while the crank passes top and bottom dead center.

In testimony whereof, we affix our signatures.

GEORGE LANE.
JOHN E. PATTERSON.